S. N. GOODALE.
Improvement in Universal Expansion-Joints for Steam and Air Brakes.
No. 130,216.  Patented Aug. 6, 1872.
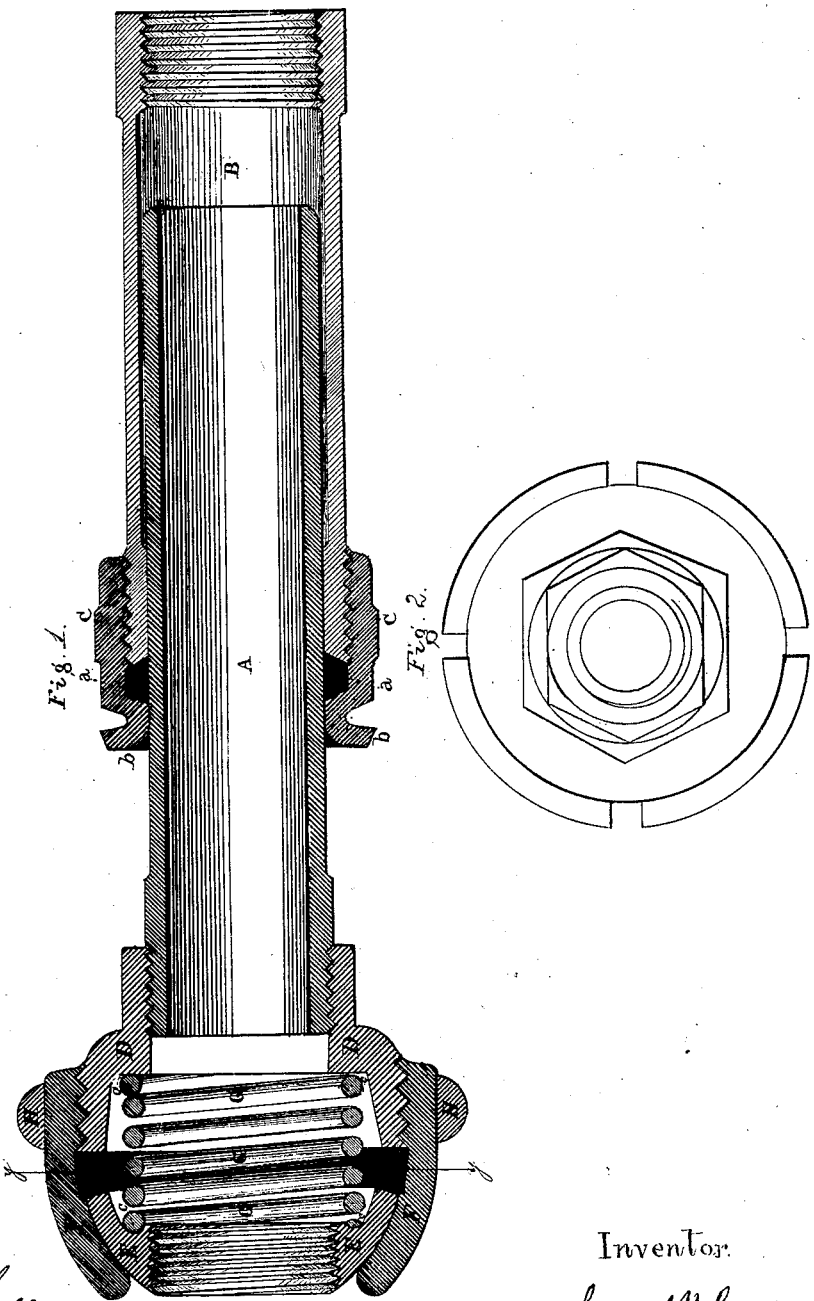
Witnesses.
Inventor.

UNITED STATES PATENT OFFICE.

SAMUEL N. GOODALE, OF ST. LOUIS, MISSOURI.

IMPROVEMENT IN UNIVERSAL EXPANSION-JOINTS FOR STEAM AND AIR BRAKES.

Specification forming part of Letters Patent No. 130,216, dated August 6, 1872.

SPECIFICATION.

*To all whom it may concern:*

Be it known that I, SAMUEL N. GOODALE, of St. Louis, county of St. Louis, State of Missouri, have invented certain new and useful Improvements in Expansion Universal Joints for Steam or Air Car-Brake Pipes, which are simple in construction, efficient and reliable in operation, and durable in use; the object of which is to provide a joint or coupling for connecting the steam or air conveying pipes beneath each car, which will allow the cars to turn in either direction, and allow the cars to be nearer to or further from each other, as cars usually are while in motion, in stopping and getting under way, while, by my improved joint and coupling, no steam or air is allowed to escape; and also by the construction of my device it is rendered self-coupling, thereby avoiding the labor heretofore necessary in making up a train upon which steam or air brakes were used; and the invention consists in the construction and combination of parts, as hereinafter described and pointed out by the claims; and I do hereby declare that the following is a full, clear, and exact description of the same, which will enable others skilled in the art to which it appertains to make and use the same, reference being had to the accompanying drawing with letters of reference marked thereon forming a part of this specification, in which—

Figure 1 is a longitudinal section of a device embodying my invention; and Fig. 2 is a transverse section of the same, taken through line *y y*, Fig. 1.

A represents an expansible connecting-pipe, secured to the joint-head D by male and female screws formed upon the respective parts. B represents a sleeve, having a female screw upon one end for the reception of the ordinary ball-joint, with a nipple to receive the end of the pipe passing under the car. The other end of the sleeve B is provided with a male screw to receive the band C, which serves the double purpose of a stuffing-box to receive the packing *a a* and a self-coupling by forming the same with the outwardly-projecting flanges *b b*, so as to receive the pipe A as the two parts A and C are brought together, the pipe A being attached to one car, and the sleeve B, having band C, to another. The pipe A may move back and forth in the sleeve B, while the packing *a a* forms a tight joint, thus preventing the escape of the steam or air. The universal joint is formed by the parts D E F, each being substantially of the form shown in Fig. 1. The head D is secured to the pipe A, as before described, and provided with a male screw to receive the cap F, which, by its form, retains within it the part E. To hold the part E outward firmly against the inside of the cap F to prevent the escape of steam or air between the parts E and F, I employ a spring, G, which rests against shoulders *c c*, formed upon the inside of joint-head D and part E. The spring G represented is a spiral spring, but it is obvious that an elliptical or other form of spring may be used without departing from the spirit of my invention so long as the spring used is of sufficient tension to hold the concave surface of the part E firmly against the convex part of the cap F under a heavy pressure of steam or air. H represents an ordinary adjustable clamp-band, secured in place in any suitable manner. Its use in this connection is to give additional strength to the cap F, and the band may be adjusted upon any part of the cap desired. The part E is provided with a female screw, as shown, for the reception of a connecting-pipe, with which each car is provided, and which need not be here described, as it forms no part of my present invention, and being fully set forth in Letters Patent granted to me May 30, 1865.

Having thus fully described my invention, what I claim, and desire to secure by Letters Patent, is—

1. The combination of a universal joint and a spring, G, when used for connecting steam or air conveying pipes, constructed and arranged to operate car-brakes, substantially as described.

2. The head D and part E, when formed with shoulders *c c* to receive the spring G, substantially as specified.

3. The combination of the head D and part E, formed with the shoulders *c c*, with spring G, cap F, and band H, substantially as described, and for the purpose set forth.

4. The universal joint, provided with the spring G, in combination with the expansion-pipe A and sleeve B, substantially as specified, and for the purpose set forth.

5. The combination of the universal joint, provided with the spring G, the pipe A, sleeve B, and band C, the several parts being arranged substantially as shown, and for the purpose described.

6. The combination of the universal joint, expansion connecting-pipe A, and self-coupling b b, substantially as described, and for the purpose specified.

SAMUEL N. GOODALE.

Witnesses:
S. N. GOODALE, Jr.,
LOUIS ROHRER.